No. 665,778. Patented Jan. 8, 1901.
M. A. GREEN.
ROTARY ENGINE.
(Application filed Feb. 9, 1900.)

(No Model.) 6 Sheets—Sheet 1.

WITNESSES:
Jos. A. Ryan
Edw. W. Byrn.

INVENTOR
Martin A. Green.
BY Munn & Co.
ATTORNEYS

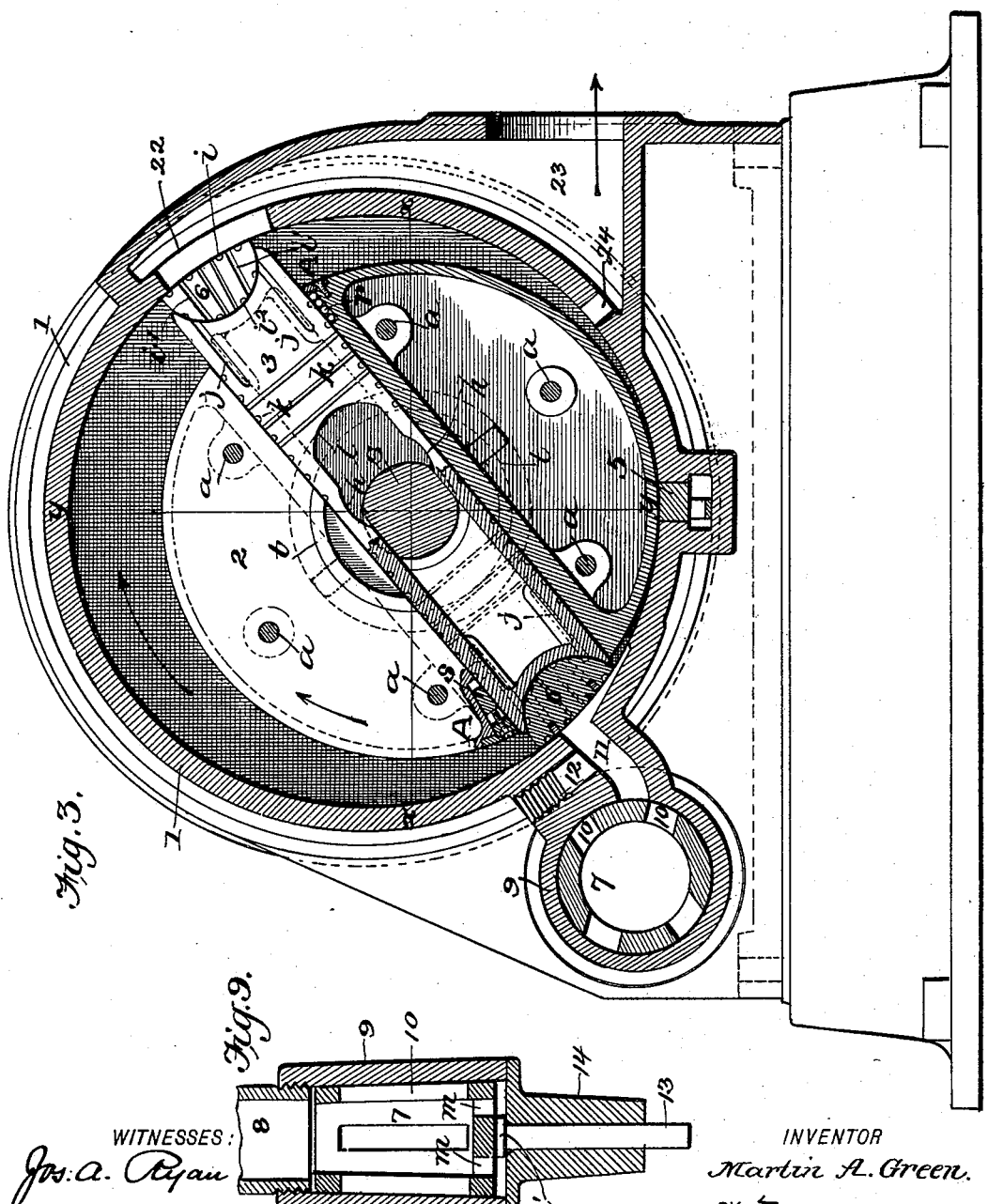

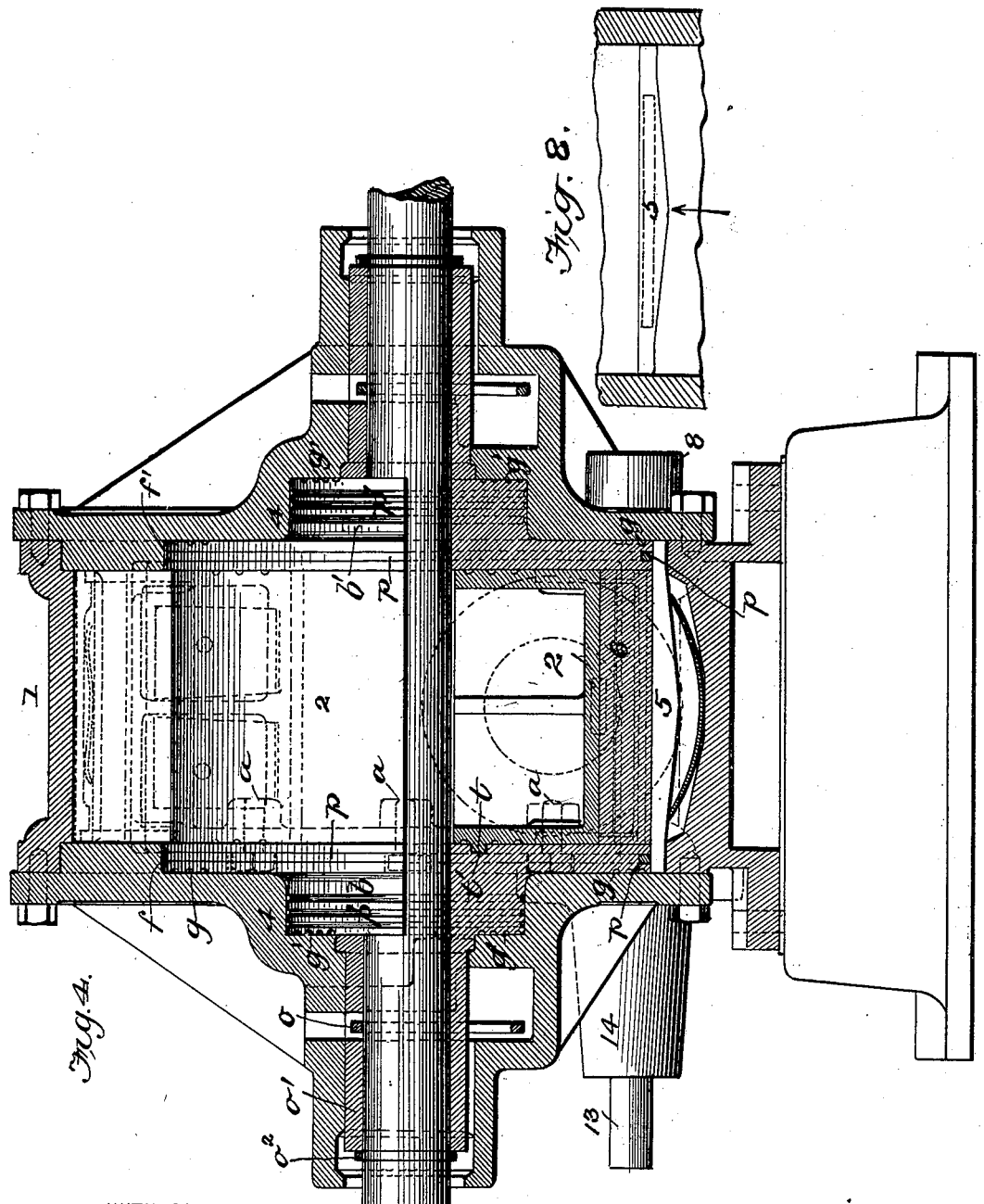

No. 665,778. Patented Jan. 8, 1901.
M. A. GREEN.
ROTARY ENGINE.
(Application filed Feb. 9, 1900.)
(No Model.) 6 Sheets—Sheet 4.

WITNESSES:
Jos. A. Ryan
Edw. W. Byrn.

INVENTOR
Martin A. Green.
BY Munn & Co.
ATTORNEYS

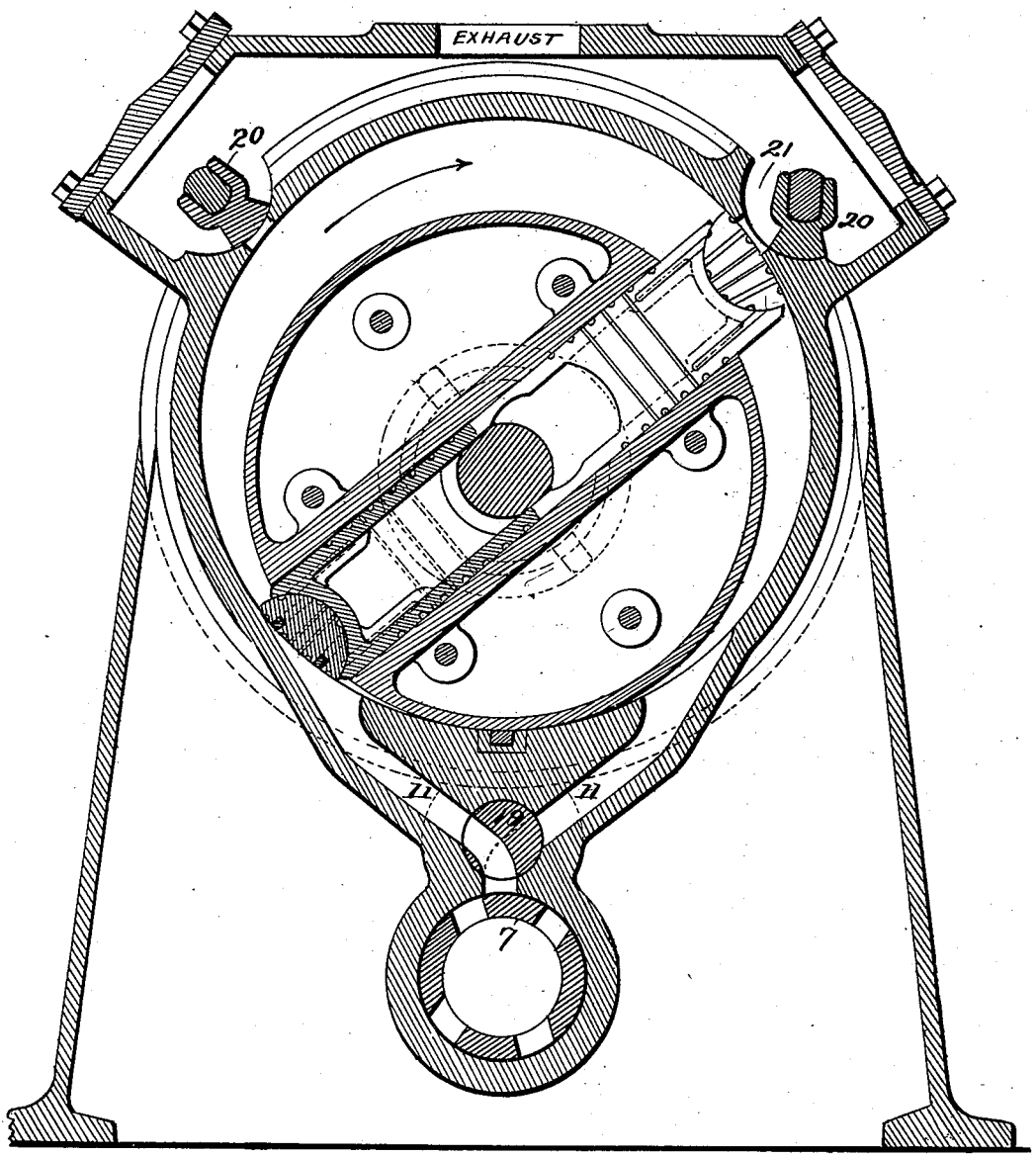

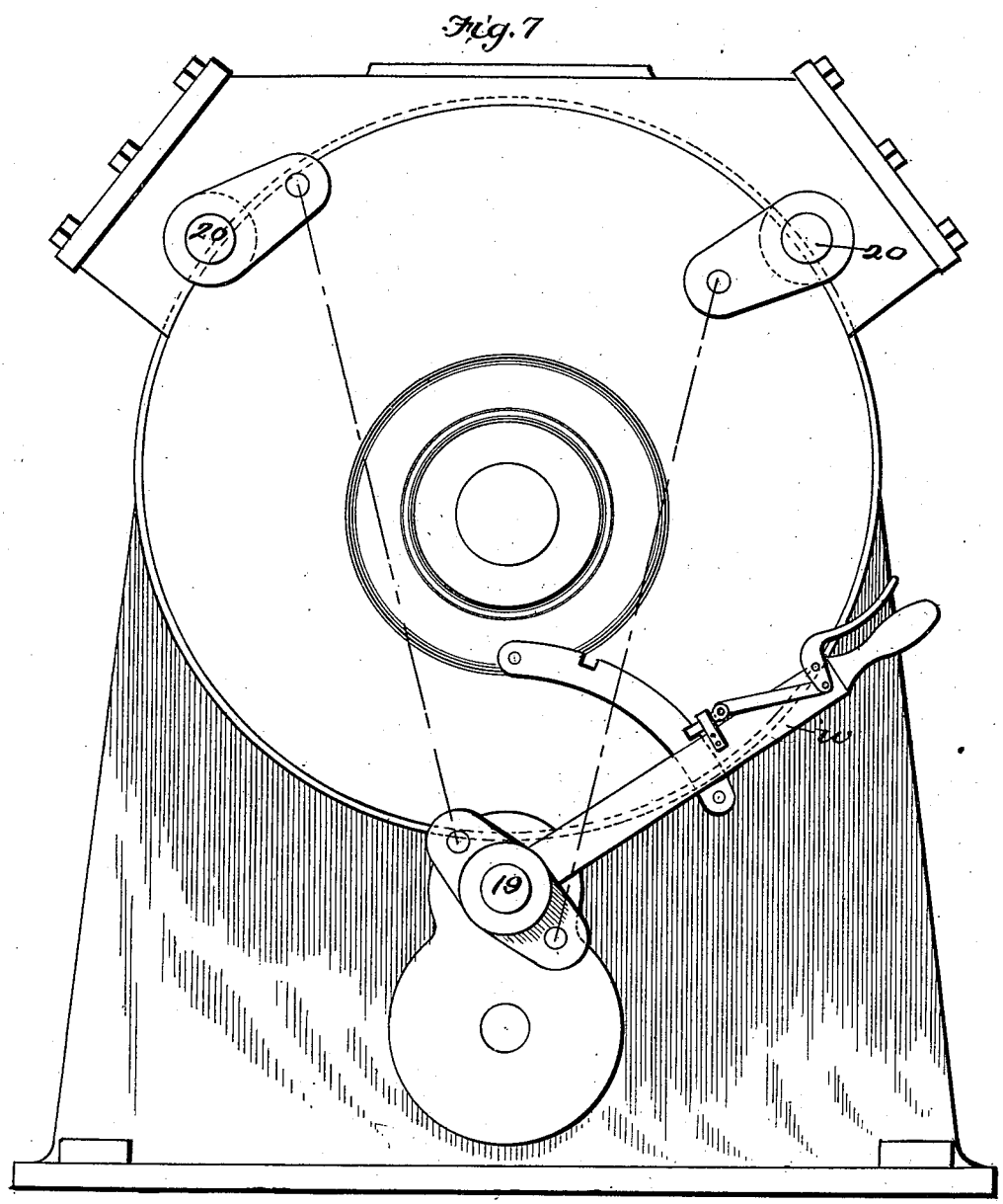

UNITED STATES PATENT OFFICE.

MARTIN A. GREEN, OF PHILADELPHIA, PENNSYLVANIA.

ROTARY ENGINE.

SPECIFICATION forming part of Letters Patent No. 665,778, dated January 8, 1901.

Application filed February 9, 1900. Serial No. 4,637. (No model.)

*To all whom it may concern:*

Be it known that I, MARTIN A. GREEN, of Philadelphia, in the county of Philadelphia and State of Pennsylvania, have invented a new and useful Improvement in Rotary Engines, of which the following is a specification.

My invention is in the nature of a new rotary engine designed to be operated either by steam, air, or vapor of any kind or by water or liquid of any kind and applicable also for use as a water-meter or by forcibly driving it in the opposite direction applicable for use as a pump or blower. It belongs to that class of rotary engines in which an eccentrically-arranged hub is made to revolve within a case and is provided with sliding piston-faces which are carried by the hub and slide in and out across the space lying between said hub and the interior of the case.

My invention comprises various novel features of construction, arrangement, and operation, which I will now proceed to more particularly describe, with reference to the drawings, in which—

Figure 2:
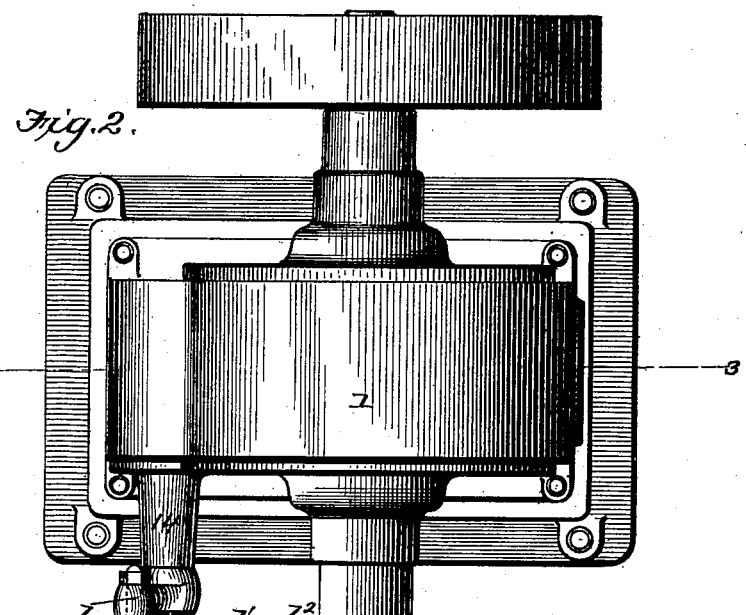
Figure 1:
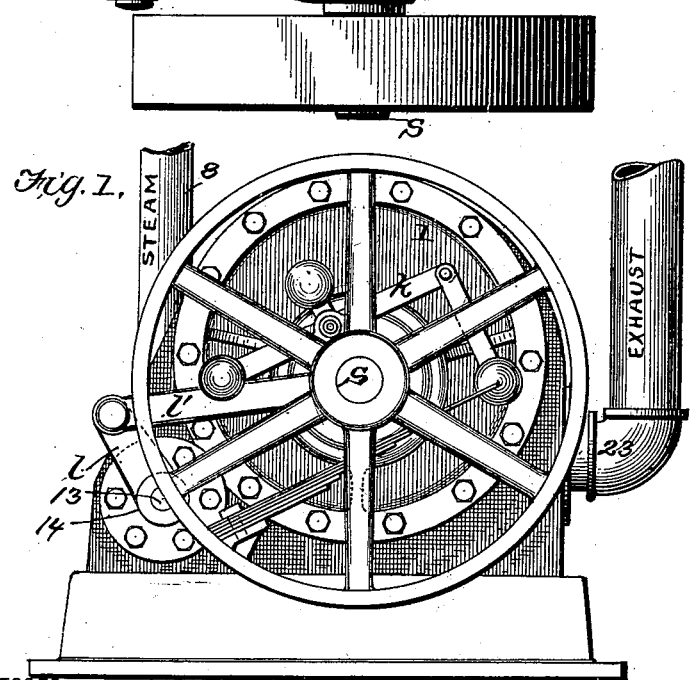
Figure 5:
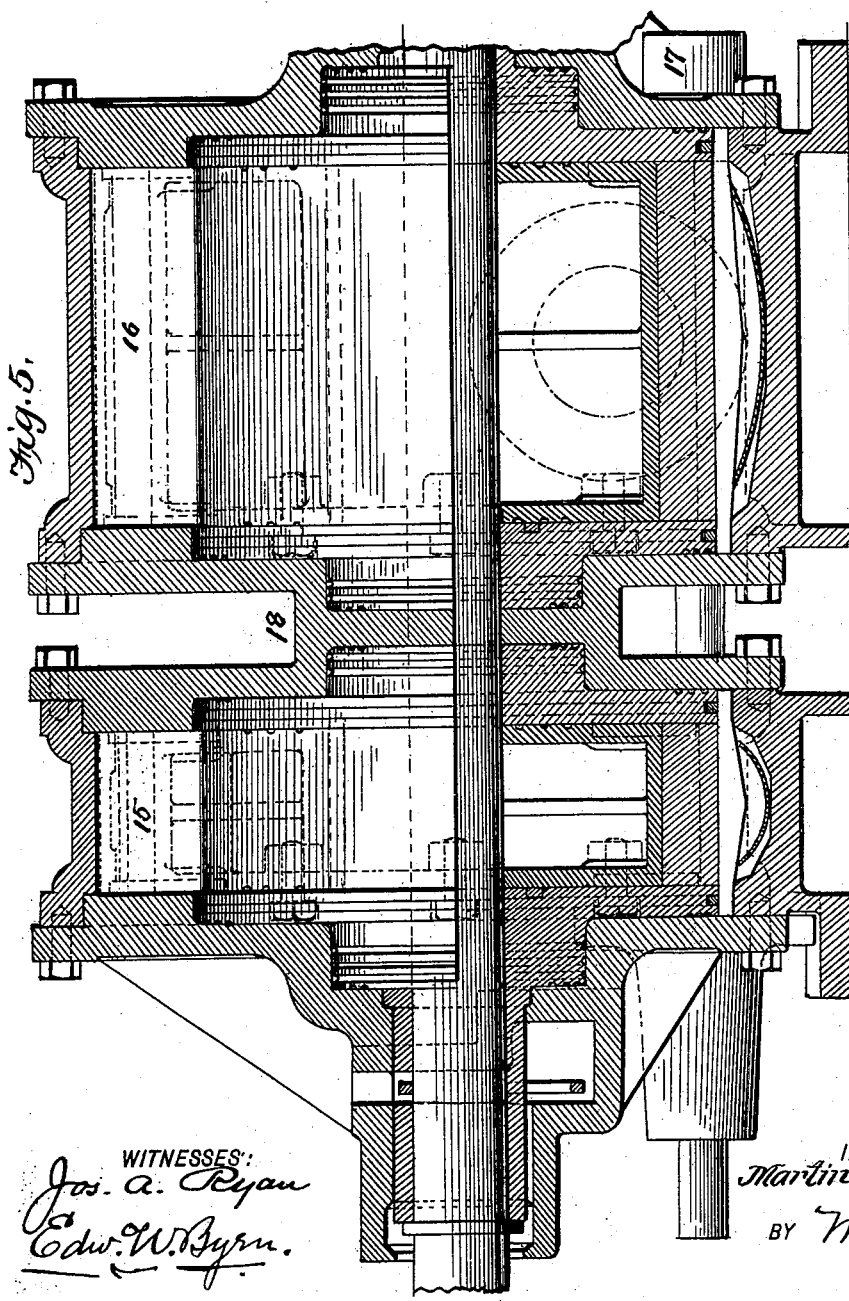

Figure 1 is a side elevation, and Fig. 2 a plan, of the exterior of the engine. Fig. 3 is a vertical transverse section on line 3 3 of Fig. 2, showing half of the piston and hub in side view. Fig. 4 is a vertical longitudinal section with part of the piston-hub in side view. Fig. 5 is a similar view of the rotary engine compounded for a second expansion. Fig. 6 is a transverse section, and Fig. 7 a side view, showing my invention applied as a reversible rotary engine. Fig. 8 is a top plan of a detail, and Fig. 9 a longitudinal section through the steam-inlet valve.

In the drawings, Figs. 3 and 4, the numeral 1 indicates the outer casing, whose interior wall is bored oblong instead of circular in form, the horizontal diameter being the major axis and the vertical diameter the minor axis. In getting an oblong bore for the cylinder this is accomplished merely by shifting the center of the boring-tool along the major axis of the oval. This gives a curvature of the same radius to every part of the interior of the cylinder and parallel walls for a short distance at the points on the minor axis of the oval, which is a matter of great importance in securing always a close and constant fit of the piston, as hereinafter described.

Within the case there rotates a circular piston-hub 2, having a diametrical channel-way through it, in which slides the piston 3. The piston-hub 2 is set eccentrically to the bore of the case 1, as is also the shaft S, and the piston 3 is of invariable length—that is to say, it extends all the way through the piston-hub—and contacts at both ends with the interior wall of the case, and the movement of one end of the piston is exactly commensurate in extent with the movement of the other end of the piston—$i. e.$, the piston proper is rigid from end to end and one end protrudes beyond the piston-hub into the crescent-shaped space between the hub and the outer casing just in proportion as the other end withdraws into the hub, the portion of the piston which projects across the crescent-shaped space being the steam-pressure surface on which the steam acts and by which the piston and hub are rotated. The piston, as will be seen, is double-acting—that is to say, it takes steam twice in each complete revolution.

As the hub 2 is eccentric to the case 1 and the piston 3 is invariable in length, the reason for making the bore of the case 1 oblong will now be apparent, for it is essential that the two ends of the piston must always be in contact with the interior walls of the case, and as the center of rotation of the hub 2 is below the center of the case the horizontal distance $x\ x$ must be exactly the same as the vertical distance $y\ y$, and as $x\ x$ is less than the true diameter of a circular case the case 1 is required to be flattened vertically to make $x\ x$ and $y\ y$ exactly equal, a condition rendered necessary by the invariable length and integral character of the sliding piston 3, which must always tightly scour at both its ends against the internal wall of the case.

The piston-hub 2 is rigidly fixed to the shaft, and at each end it is formed at its periphery with flanges $f\ f'$ (see Fig. 4) and also with bosses $b\ b'$, both flanges and bosses being recessed into the heads 4 4 of the outer case. One of these flanges $f$ and bosses $b$ is constructed upon a detachable plate which is bolted at $a$ to the piston-hub. The object of this is to permit the diametrical channel-way in the piston-hub through which the piston 3 plays to be planed out true with a straight cut from side to side to receive the piston, after which the detachable head-plate f b is bolted on. To cause the loose head-plate to properly register with the hub, a curved tongue or flange t, Fig. 3, is formed on the side of the hub, which fits into a corresponding groove t', Fig. 4, in the detachable head-plate, which when placed together make a rigid connection and hold the two parts exactly true in relation to each other. When the piston revolves from the force of the steam acting in the direction of the arrow, the pressure of the sliding piston 3 against the channel-way of the hub comes at the points A A, and to reduce friction at these points antifriction-rollers r or hardened wear-shoes s may be located at these points. When the thrust of the piston is in an invariable direction, such rollers or shoes are required at only one side at each end of the piston; but in a reversible engine, hereinafter described, such antifriction or wear surfaces must be located upon both sides of the piston at each end.
The flanges f f' of the piston-hub bear on their edges (see Fig. 4) packing-strips p, and the bosses b b' have also packing-strips p', which fitting against the recessed edges of the heads 4 of the casing make a perfectly steam-tight joint. There are also water-packing grooves g g' turned in the sides of said flanges and in the ends of the bosses, which help to lubricate these surfaces and also prevent the steam from passing.
At the bottom of the case or shell 1 there is formed a recess, and in it is placed a metal packing-strip 5, thickest in the middle and located at the point of contact between the piston-hub and the outer case to make a tight joint which prevents leakage of steam past the same to the exhaust. This packing-strip has in the recess beneath it (see Fig. 4) a subjacent bowed spring that holds the packing-strip up to constant and close contact with the piston and its hub. In order that the piston may freely pass this packing-strip, the back side of the strip (see Fig. 8) is made with a double incline from the middle and tapers to both ends, so that the piston strikes it first at its middle portion in passing over it in the direction of the arrow and with a shear movement is gradually led onto the surface instead of having the straight edge of the piston strike a straight edge of the strip all at once.
The packing-strip 5 and its recess are also made of sufficient vertical depth to prevent the strip from turning or twisting in its recess by the dragging action of the piston in passing it.
The piston 3 is a hollow block with flat parallel sides slotted at its ends at l to pass over the shaft, which latter may be flattened slightly to permit the walls of the piston to be made thicker. When so flattened, the walls of the piston will have to be cut out a little, with curved recess h in the middle on each side, so as to permit the round portions of the shaft to slide through the same in coupling up the parts. The piston is made in one piece, and its outer edges have concave circular seats formed in them in which rock circular blocks 6. The outer faces of these blocks are curved to the contour of the inner surface of the case 1, and on account of the circular form of their concave seats the piston is not increased or diminished in length as it rotates, but the blocks simply rock to adjust themselves to the different angular positions of the piston in relation to the case. Said circular blocks have packing-strips $i\ i'\ i^2$ on their ends and faces to prevent leakage. There are also packing-strips j on the edges of the piston to prevent leakage. The piston 3 also has grooves k around it, forming a water-packing which prevents steam from passing through the piston-hub and also provides for lubrication. These grooves may, however, be filled with packing-strips, if desired.

At one side of the case 1 there is formed a circularly-bored steam-chest 9, Fig. 3, within which rocks a rotary tubular steam-valve 7. With one end of the steam-chest there communicates the steam-inlet pipe 8, Figs. 4 and 9, and through the hub or collar 14 at the other end there protrudes the stem 13, by which the valve is rocked through an eccentric, hereinafter described, to regulate the admission of steam. The steam-admission valve 7 has four longitudinally-arranged ports. Two of them, 10 10, Fig. 3, are arranged to be brought alternately into registration with the passage-way 11, leading into the steam-space of the engine, and the other two ports on the opposite side are merely for balancing the valve. As there is but one steam-admission port 11 to the engine and as there are two steam-actuated faces to the piston, one at each end, steam has to be admitted at each half-revolution, for which purpose the valve 7 rocking in one direction brings one port 10 into registration with steam-passage 11 and rocking in the other direction brings the other port 10 in registration with the passage 11. To impart this motion to the rocking valve, a crank l (see Figs. 1 and 2) on the end of the valve is connected to a rod l', worked by an eccentric $l^2$ on the main shaft in the usual way. By well-known means this rotary valve may be arranged to cut off steam at any point in the half-revolution of the piston, so as to use it expansively, and when the engine is to be made automatic in cutting off steam a fly-governor k, Fig. 1, is arranged in the wheel, and its valve is controlled and made to cut off automatically to admit sufficient amount of steam, with the aid of expansion, in keeping with the load that the engine is called upon to take care of. Such a governor is well known, and as it forms no part of my invention need not be further described. When, however, the engine is used like a plain slide-valve engine, with a fixed eccentric on the main shaft connected to the crank-arm on the valve by means of a connectingrod, then the valve has an invariable travel. This would also be the case when my engine is made reversible, as hereinafter described. In such instances a throttling-governor can be used on the steam-pipe the same as used on the plain slide-valve crank-engine. The rotary valve 7 and also its case are bored to a slight taper, as seen in Fig. 9, and as one end of this valve is open and the other partly opened only by spaces m the valve has a sufficient thrust when the collar m' bears against the hub 14 to cause said collar to make a steam-tight joint in the hub 14 without the use of a stuffing-box.

In making use of my invention I may use an ordinary slide-valve or piston-valve, if desired.

In Fig. 3 is shown at 12 a by-pass steam-port, whose function is as follows:

If the engine should be stopped at a point where valve 7 had closed the steam-admission port 11, the piston being driven by expansion at that point, the engine would be in the same condition as a crank-engine on the dead-center and could not be started except by moving the parts to a position to take steam. The by-pass steam-port 12 is to provide for this difficulty, and it is connected by a small steam-pipe (not shown) having a valve in it to the main steam-pipe. If the engine then stops at such dead-point, the valve in the small pipe is opened by hand to admit steam and start the engine, and thereby move it a sufficient distance to cause the eccentric to operate the rocking valve and continue automatic action.

In arranging the axial bearings of my engine the cylinder-heads have self-oiling ring-bearings (see Fig. 4) bushed with antifriction metal at o', the loose rings o on the shaft dipping down into the oil-chamber and rolling on the shaft to carry up oil, while the rings $o^2$ at the outer ends of the bushings catch the surplus oil and throw it down into the recess of the bearings and return it to the oil-chamber, in which the oil-distributing rings travel, thereby automatically oiling the main bearings, while a sight-feed lubricator on the main steam-pipe (not shown) lubricates all the internal portions of the engine, so that the engine can be operated without the use of a single oil-cup. These features are, however, old and well known and form no part of my invention.

The operation of my invention is best understood from Fig. 3. At a point opposite the inlet-port 11 there is an exhaust-port 22, which when the piston passes it opens communication between the crescent-shaped live-steam space and an exhaust-chamber 23, connected with a suitable discharge-pipe. A small opening 24 establishes communication between the exhaust-chamber 23 and the tapering space behind the piston, and after the piston passes exhaust-port 22 allows the escape of steam behind the piston, so that there is no back cushion of steam. In the position shown the steam in the crescent-shaped space has acted upon the upper face of the piston and forced it around, either by continuous inflow or cut-off action, and is just about to exhaust through the port 22, which it does when the block 6 of the piston passes the same, and the next admission of steam acts upon the lower end of the piston to continue the motion in the same direction.

In large engines the piston 3 may be made in several pieces for more convenient and practical construction.

In Fig. 5 is shown a modification of my invention in which it is shown as a compound rotary engine. The high-pressure cylinder 15 is of relatively narrow width and the low-pressure one, 16, is of broad face to accommodate the expansion. The same valve is used as in the single engine, the valve-stem extending through and controlling both valves. The steam in the high-pressure-cylinder, however, is admitted on the back of the steam-chest instead of the end, as in the single cylinder, and the exhaust from the high-pressure cylinder is admitted on the back of the steam-chest of the low pressure and exhausted through pipe 17.

Instead of having simply two cylinders for the compound form I may use any number of cylinders of increasing area for successive expansions, all being placed on the same shaft and connected by the double cylinder-heads 18, by which the cylinders are all coupled together and made rigid, or the high-pressure and low-pressure cylinders may be built separately, with bearings at each end, the same as shown in Figs. 3 and 4, and all set on one cast-iron base, the shaft passing through the several cylinders or engines and having separate eccentrics on the main shaft to control each valve on each engine separately.

In Figs. 6 and 7 my invention is shown modified as a reversible engine. In all respects it is the same as the engine shown in Figs. 3 and 4, except in the manner of taking and discharging the steam. In this case the valve 7 is placed centrally under the engine and the reversing-plug 19 is placed at the junction of two steam-ports 11, and two exhaust-valves 20 20 are employed. The three valves 19 20 20 are provided with cranks at their ends, (see Fig. 7,) which are connected by rods, as shown by lines, the rods connecting the cranks of valves 20 20 to the oppositely-projecting cranks on plug-valve 19 and being operated by a hand-lever to open the left-hand port 11 and the right-hand exhaust-valve 20 or open the right-hand port 11 and the left-hand valve 20, according to the direction in which the engine is to be run. The admission-valve 7 is, however, to be operated automatically by the eccentric, as in Figs. 3 and 4, for a full steam admission or cut-off, as may be desired. As the engine runs the valves 19 and 20 stand still and there is no wear on these. As now shown in Fig. 6, the engine is in position to run in the direction of the arrow, steam entering through the left-hand port 11 and exhausting at 21 past the right-hand valve 20.

This engine is adapted for all purposes where a reversible engine is required, as for steamship-propellers, &c., and the engine may be compounded as many times as required to get the full benefit of the steam.

The by-pass port 12 and valve shown in Fig. 3 may also be used on the compound and reversible engine, so that there will be no dead-centers, or when two reversible engines are used on the same shaft the valve-chambers can be moved around a little, so that if one engine is on the dead-center the other is off, and live steam can be admitted with the low-pressure cylinders to start in case the high-pressure cylinder is on the center or point where the valve is closed.

Having thus described my invention, what I claim as new, and desire to secure by Letters Patent, is—

1. The combination in a rotary engine, of a cylinder having an oblong bore every part of whose curved surface is described by the same radius but from different centers, a rotating hub set eccentrically therein and tangentially to one side of the cylinder on the minor axis, a piston of invariable length sliding diametrically through the hub and having a longitudinal slot and concave circular seats in its ends, correspondingly-shaped rocking blocks arranged in the seats and having their outer surfaces curved to correspond to the inner surface of the cylinder, and a continuous shaft extending through the middle slot of the piston substantially as and for the purpose described.

2. In a rotary engine the combination with the case having recessed heads 4, 4; of an eccentric rotating hub having flanges fitting in the recesses of the heads, a piston made in one piece and of invariable length and sliding diametrically through the hub and having a longitudinal slot in its middle portion, and a shaft passing continuously through the hub and the slot of the piston substantially as and for the purpose described.

3. In a rotary engine, the combination with the case having recessed heads 4, 4, of an eccentric rotating hub, having peripheral flanges $f$ and bosses $b$ in the recesses of the heads, a diametrical piston made in one piece and of invariable length and sliding through the hub and having a middle slot, a continuous shaft passing through the piston, and rocking blocks seated in the ends of the piston and having their outer surfaces curved to correspond with the inner surface of the cylinder and provided with packing-strips substantially as and for the purpose described.

4. In a rotary engine, the combination with the outer case, and the eccentric and tangentially-arranged hub revolving within the same and carrying a sliding piston; of a spring-seated packing-bar seated in a recess in the outer case at the tangential point of the hub and having its face which contacts with piston made thickest in the middle and tapering thence to both ends with the wedge side arranged to contact first with the piston and lead it over by a balanced shear movement as described.

5. A rotary engine having a case, and a revolving piston, said case having a yielding packing-strip made wedge-shaped with the point of the wedge in the middle and arranged to first come in contact with the piston as and for the purpose described.

6. In a rotary engine, the combination of an oblong-bored case, with revolving hub set eccentrically in the same and having a diametrically-arranged sliding piston made in one piece and slotted through its middle, a shaft passing through the middle slot of the piston, the case of the engine being provided on one side with rocking valve 7, double induction-ports 11, 11, and reversible plug 12, and having on the other side two exhaust-valves 20, 20 and an inclosing casing for the same substantially as described.

7. In a rotary engine, the combination of the oblong case a flattened shaft passing continuously through the case, the eccentric rotating hub with diametrical channel-way, a sliding piston arranged therein and having a middle slot to receive the shaft enlarged at two points $h\ h$ to the full diameter of the shaft to give endwise passage to the same substantially as described.

In testimony whereof I have signed my name to this specification in the presence of two subscribing witnesses.

MARTIN A. GREEN.

Witnesses:
ALBERT S. SMITH,
LOUIS LEWIS.